May 21, 1968 E. R. CUNNINGHAM 3,383,828
METHOD AND APPARATUS FOR ASSEMBLING CARRIERS TO CONTAINERS
Filed May 19, 1965 8 Sheets-Sheet 1
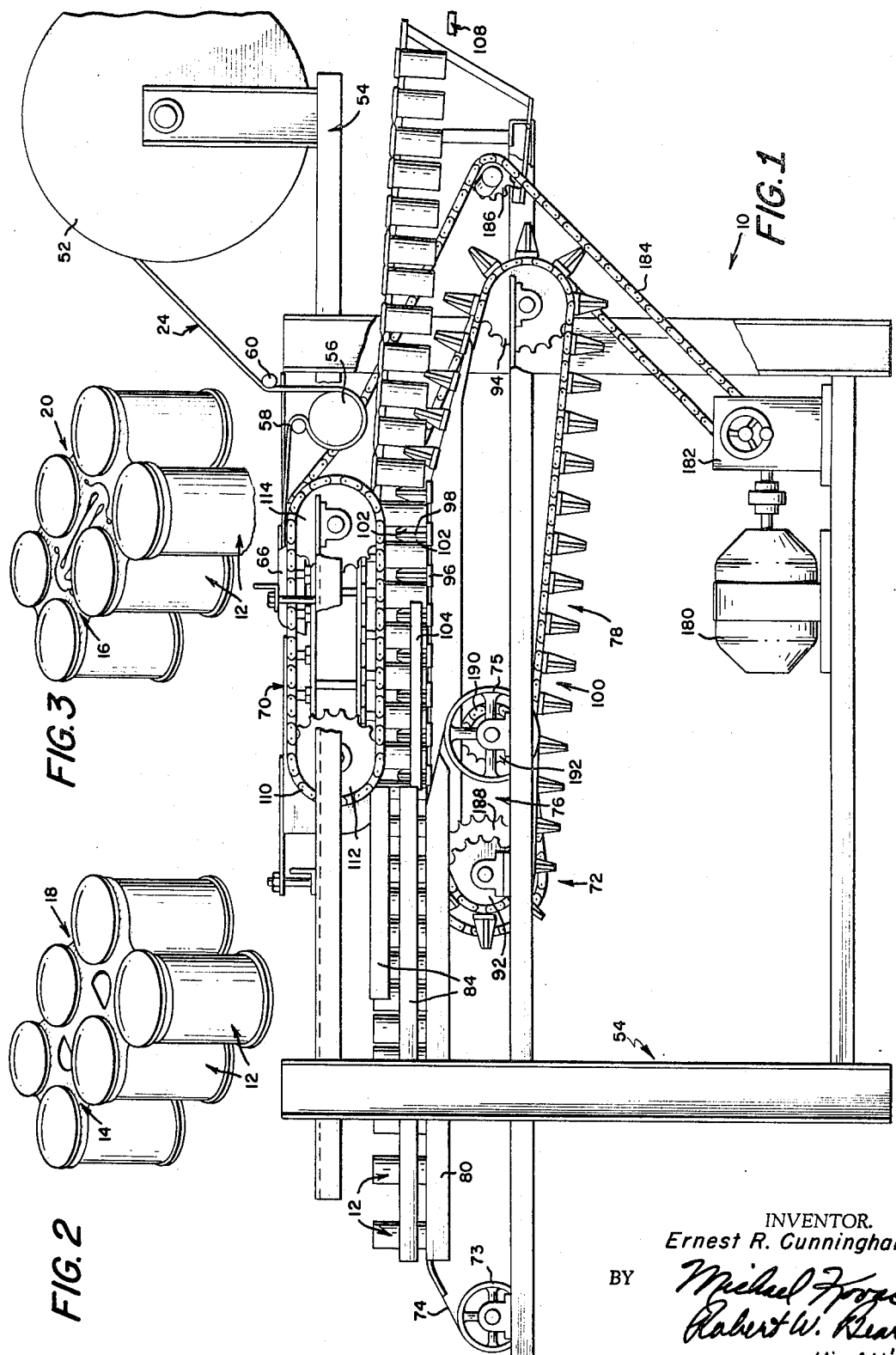
INVENTOR.
Ernest R. Cunningham
BY
His Att'ys May 21, 1968  E. R. CUNNINGHAM  3,383,828
METHOD AND APPARATUS FOR ASSEMBLING CARRIERS TO CONTAINERS
Filed May 19, 1965  8 Sheets-Sheet 2

INVENTOR.
Ernest R. Cunningham
BY
His Att'ys

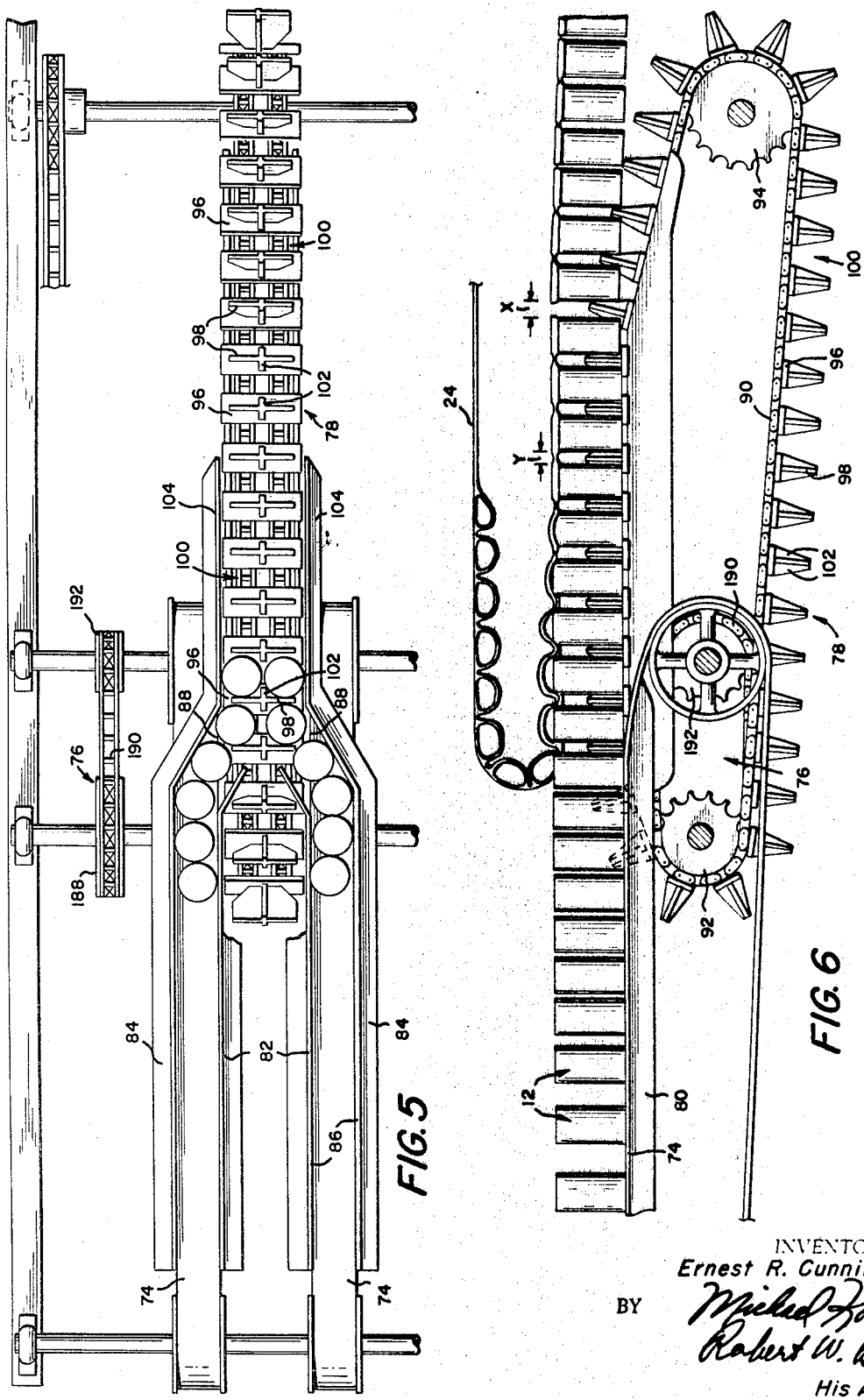

INVENTOR.
Ernest R. Cunningham

May 21, 1968     E. R. CUNNINGHAM     3,383,828
METHOD AND APPARATUS FOR ASSEMBLING CARRIERS TO CONTAINERS
Filed May 19, 1965     8 Sheets-Sheet 5
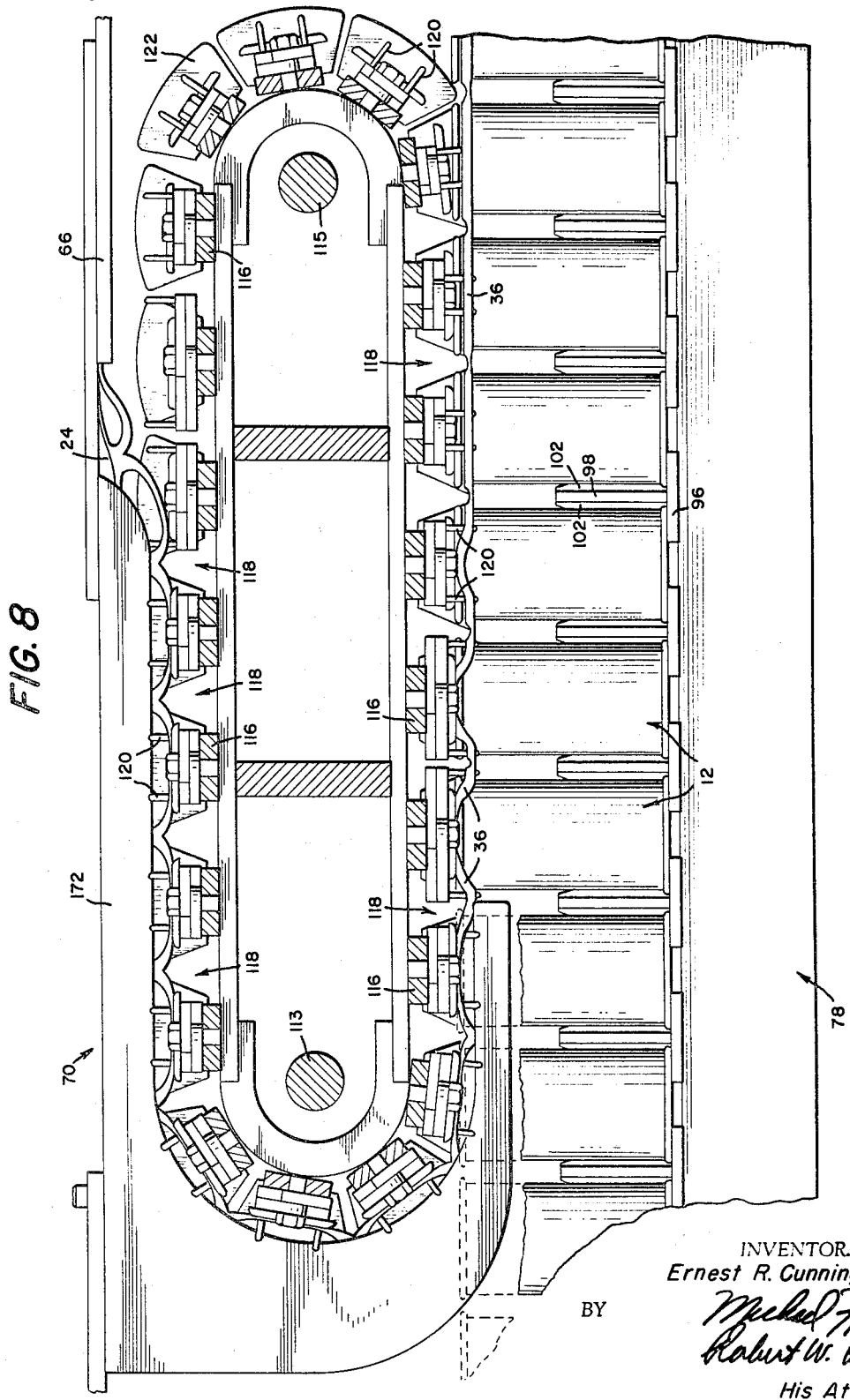
INVENTOR.
Ernest R. Cunningham
BY
His Att'ys May 21, 1968  E. R. CUNNINGHAM  3,383,828
METHOD AND APPARATUS FOR ASSEMBLING CARRIERS TO CONTAINERS
Filed May 19, 1965  8 Sheets-Sheet 6

INVENTOR.
Ernest R. Cunningham
BY
His Att'ys

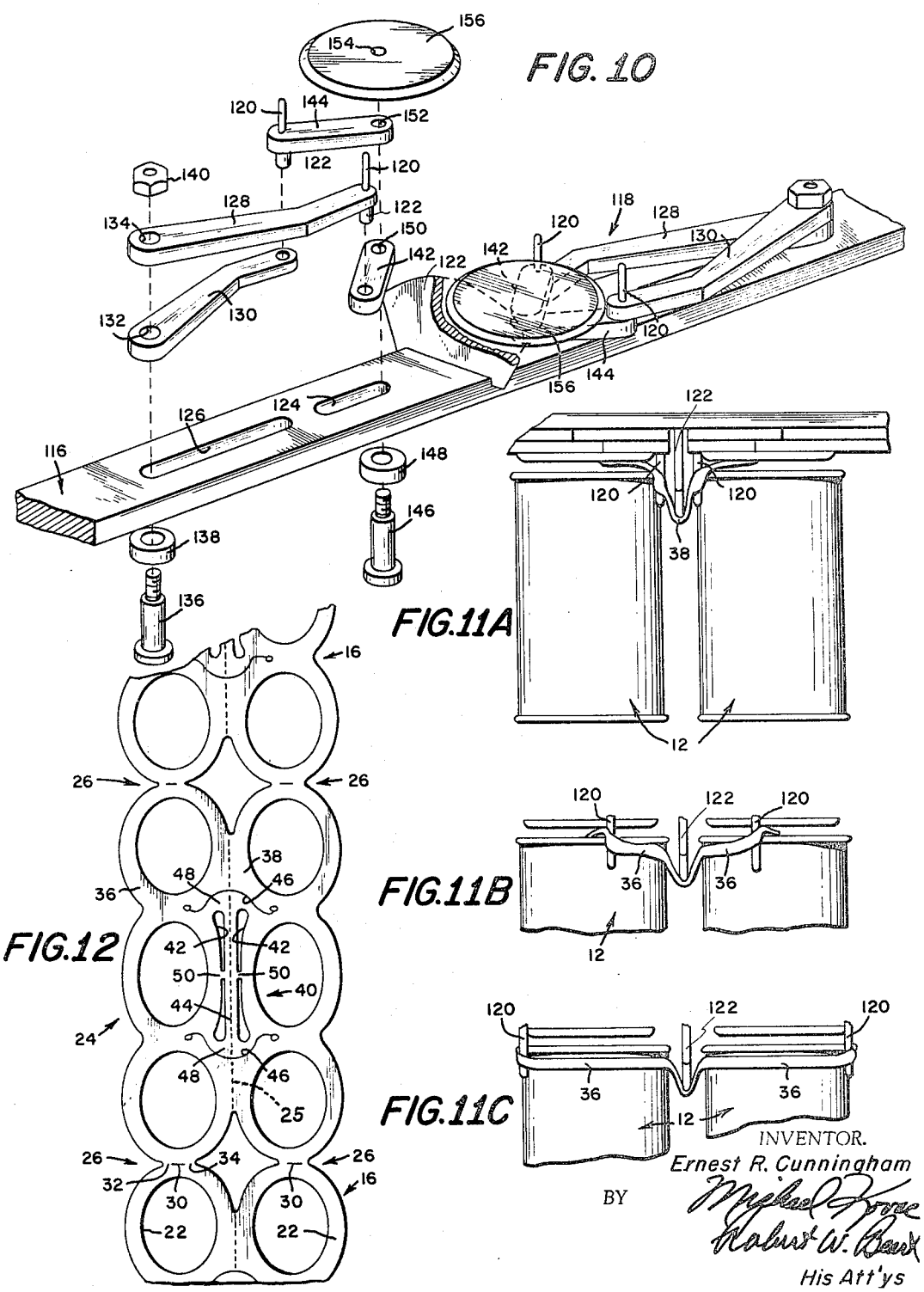

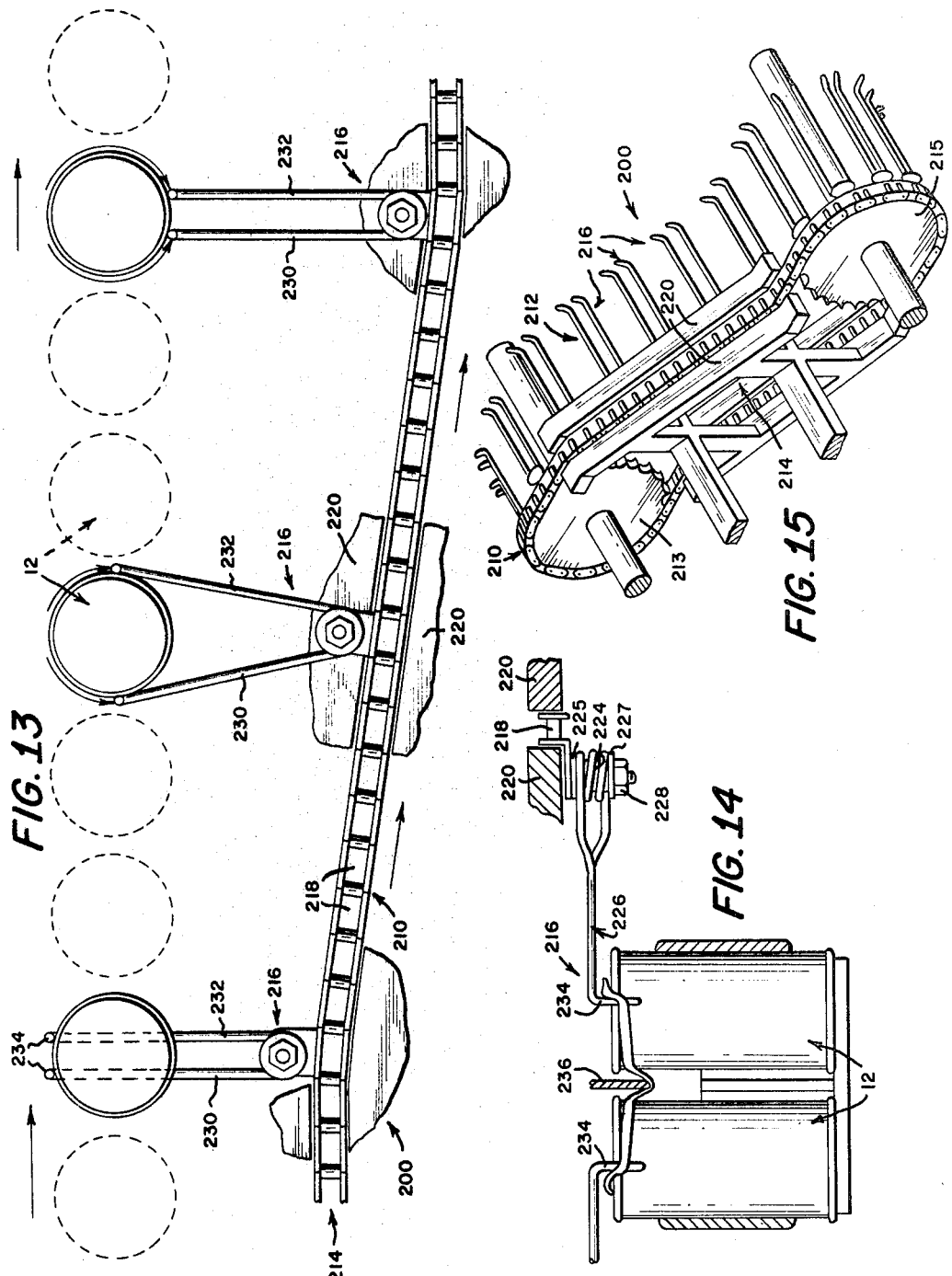

United States Patent Office 3,383,828
Patented May 21, 1968

3,383,828
METHOD AND APPARATUS FOR ASSEMBLING CARRIERS TO CONTAINERS
Ernest R. Cunningham, Libertyville, Ill., assignor to Illinois Tool Works Inc., Chicago, Ill., a corporation of Delaware
Filed May 19, 1965, Ser. No. 456,914
33 Claims. (Cl. 53—35)

ABSTRACT OF THE DISCLOSURE

Method and apparatus for progressive circumferential expansion and assembly of apertured plastic sheet carrier devices of the type shown in U.S. Patent No. 2,874,835 to a group of containers to form a container package.

---

Machines which have been developed to assemble containers with carriers of the type shown in the aforementioned patent are, in the order of their chronological development, shown in U.S. Patents Nos. 2,929,181, 3,032,943, 3,032,944 and 3,204,386, all of which are assigned to the same assignee as the present invention. The method and apparatus of the present invention is an improvement over the machines and methods disclosed and claimed in these last mentioned patents, while the carrier device and strip disclosed herein facilitates the assembly of containers with carriers to form packages of the type disclosed above.

In assembling containers with an elastic sheet carrier of the type disclosed in U.S. Patent No. 2,874,835 wherein a plurality of constrictive apertures are provided to receive a corresponding number of containers, the material adjacent the apertures is preformed or stretched during installation into a substantially frusto-conical shape causing gripping of the containers below the radial beads or enlargements found on the cylindrical metallic containers or cans. It is important that the material adjacent each aperture is not stretched beyond the point of its elastic recovery, and the present invention is concerned in part with this particular aspect. It is also important that the method and apparatus employed for assembling carriers with containers will permit the assembly to be carried out rapidly and efficiently while using a minimum number of procedural steps or operating mechanisms.

Accordingly, it is an object of the present invention to provide an improved method and machine for automatically assembling containers and apertured carrier members to form assembled packages of containers for carrying.

Another object of the present invention is to provide an improved method and apparatus for assembling containers and elastic sheet carriers with a minimum amount of stretching of the carriers as they are applied to the containers.

A further object of the present invention is to provide an improved method and apparatus for effectuating rapid transfer and assembly of containers and carrier members in an assembly zone.

Still another object of the present invention is to provide a low cost machine of relatively simple construction which provides high volume production of container carrier packages.

A still further object of the present invention is to provide a machine of the foregoing type with an improved container infeed mechanism which rapidly loads containers onto a conveyor belt in a faultless and prescribed manner for high speed delivery thereof through the machine.

Yet another object of the present invention is to provide a machine of the foregoing type with an improved carrier assembling mechanism which provides reliable, very high speed continuous assembly of apertured carrier members to containers in a trouble free manner.

Another object of the present invention is the provision of a machine of the type set forth in the foregoing objects which assembles an interconnected series of carriers to containers, and also separates carriers from the strip during and/or after application to containers without the need for a separate cutoff mechanism.

Yet still another object of the present invention is to provide an improved carrier device and strip which facilitates the assembly of a strip of interconnected carriers to containers, and subsequent separation of carriers assembled to containers to form discrete package units.

Other and further objects and advantages of the present invention will become apparent from the following description when taken in connection with the accompanying drawings wherein.

FIG. 1 is a side elevational view of a machine embodying the features of my invention;

FIG. 2 is a perspective view of one form of package which may be manufactured by practicing the method and apparatus of the presen invenion;

FIG. 3 is a prespective view of another form of package which may be produced;

FIG. 5 is a plan view of the container infeed mechanism of my improved machine with the carrier assembling mechanism removed;

FIG. 6 is a side elevational view of the container infeed mechanism shown in FIG. 3;

FIG. 8 is a fragmentary vertical sectional view showing the manner in which a succession of carriers are moved into telescopic assembly with container members;

FIG. 10 is a fragmentary partially exploded perspective view of the preferred from of carrier applying means used in conjunction with the machine shown in FIG. 1;

FIGS. 11A–11C are fragmentary side elevational views of one carrier applying means showing the assembly of a carrier to containers by progressive application;

FIG. 12 is a plan view of my improved carrier device and strip in accordance with the present invention;

FIG. 13 is a fragmentary top plan view of a modified form of carrier applying means coming within the purview of the present invention;

FIG. 14 is a fragmentary side elevational view illustrating the operation of the carrier applying means shown in FIG. 13, and FIG. 15 is a fragmentary perspective view of a modified carrier assembling mechanism used in conjunction with the FIGS. 13–14 form of carrier applying means.

While the method and machine of the present invention is preferably used in assembling cylindrical metallic containers, such as beverage cans, with container carriers of the type shown in U.S. Patent No. 2,874,835, it will be understood that glass or unbreakable bottles and other objects of the same or dissimilar configuration can be assembled with such container carriers in the manner to be discussed hereinafter.

Figure 4:
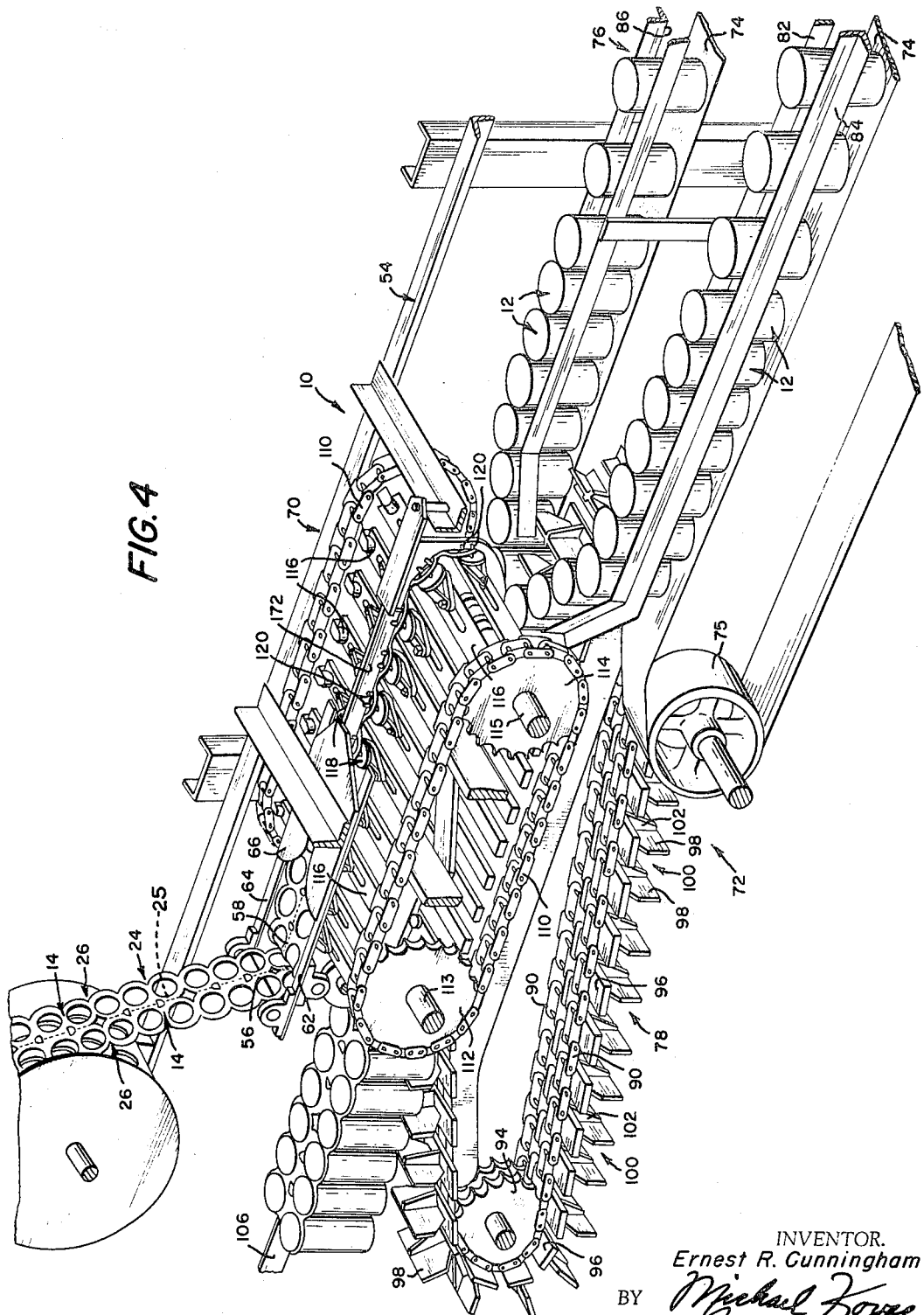
FIG. 4 is a perspective view showing the operating mechanisms of my improved machine.

Referring now in greater particularity to the drawings, and first to FIGS. 1 and 4, there will be seen a machine 10 which is well suited for use as an attachment to a container filling and closing machine (not shown). The machine 10 is capable of receiving a procession of containers 12, which have previously been filled and closed, at the lefthand side of the machine, as viewed in FIG. 1, from whence the containers are segregated and moved through the machine 10 in a prescribed fashion, to be later described, for assembly with container carriers 14, 16 of the finger hole or integral handle variety as seen in FIGS. 2–3 respectively. The assembly of a group of containers 12 with the carrier 14 will form the individual carrying package 18 as seen in FIG. 2, while the assembly of containers 12 with the carrier 16 will produce a carrier package of the type shown in FIG. 3. In certain instances, a separate handle arrangement may be desired, and this will require the modification of carrier 14 as well as the use of a separate handle inserting mechanism in conjunction with the machine 10 of the present invention such as shown, for example, in the aforementioned method and machine patents. It will be apparent, however, that the packages 18, 20 will be mainly used if a material and equipment savings is desired.

In the preferred form, each of the packages 18, 20 include six containers arranged into adjacent rows of three cans each as shown in FIGS. 2–3. For this reason, each carrier 14 or 16 is formed to provide six container receiving apertures arranged in two rows of three apertures each. It will be understood that each of the packages can have fewer than six containers, but preferably has at least two containers arranged in juxtaposed relation to each other.

As best seen in FIGS. 4 and 12, the carriers 14 and 16 respectively are preferably joined to each other to provide an elongated strip 24 which is supplied in roll form for feeding through the machine in a manner to be described below. The individual carriers are preferably formed of a resilient, elastic yet deformable material such as polyethylene, and are integrally joined to each other at adjacent ends by marginal connecting portions or webs 26. The carrier strip 24 depicted in FIG. 12 shows carriers 16 of the integral handle variety, and it is to be understood that the carriers 14 of the finger hole variety shown in the strip 24 in FIG. 4 of the drawings are also provided with thin integral connecting web 26 joining adjacent carriers.

The succession of integral carriers in strip form, although being the most practical from a manufacturing standpoint and when used with the machine 10, can be joined to each other in any suitable manner such as by staples, glue, etc. It will be obvious, however, that many advantages are enjoyed by interconnecting the carriers to each other across the thin integral connecting webs 26.

In FIG. 12 of the drawings, adjacent carriers are interconnected by a pair of connecting webs 26 disposed on opposite sides of a diagonally shaped opening 28, the portions or webs 26 each being traversed by a slot 30 so as to subdivide the connecting webs into first and second portions 32, 34 of limited cross sectional size. This facilitates rapid and effective separation of adjacent carriers from each other by tearing in the vicinity of the connecting webs 26. This tearing is preferably accomplished by the medium of generally opposed longitudinally directed forces in the vicinity of each connecting web 26 as will be discussed in detail hereafter.

Each carrier is substantially flat in its undistorted state with the opposite longitudinal and end edges being undulated as shown in FIG. 12 to leave only a flat narrow band of material 36 bounding the side portion of the apertures 22. A central web portion 38 extends between adjacent apertures, and it is in this area of the web that an integral handle or finger hold arrangement is provided.

In the strip shown in FIG. 12, an integral handle 40 is depicted intermediate the centrally positioned apertures 22 of each carrier. The centrally positioned apertures are elongated lengthwise of the strip, as compared with the outermost apertures of each carrier to permit the handle 40 to be formed therebetween. A pair of spaced, substantially parallel elongated apertures or slits 42 are disposed between these centrally located, generally elliptically shaped apertures of the carriers to define the handle strap portion 44. A second pair of slits 46, preferably curvilinear in form with reversely curving end portions, are formed beyond the terminal portion of the slits 42 and extend generally transverse to the handle strap portion 44. By forming the slits 46 in this manner, a pair of linking webs 48 will be provided for integrally connecting the handle strap portion 44 to inwardly directed portions of the material adjacent the generally opposed apertures at points laterally outwardly offset from the handle strap portion.

The linking webs 48 serve to increase the upward displacement of the handle strap portion 44 to facilitate manual gripping and carrying of the package. As the carrier is applied to the containers, the plastic material adjacent the apertures 22 which are smaller than the containers, stretch and enlarge, and this causes the carrier to draw in longitudinally so as to move the ends of the strap 44 toward each other to deflect it above the plane of the sheet. Difficulty has been experienced in applying integral handle carriers to containers primarily due to interference of the carrier handle strap 44 with certain operating mechanisms of the machine. To forestall the effect of this handle displacement, a pair of readily fracturable connecting tabs 50 join the handle strap portion 44 to inwardly directed marginal portions surrounding the centrally positioned apertures so as to maintain the handle strap in the plane of the carrier, at least until the carrier is assembled to the containers.

Referring now to the machine 10 for a specific description of the various components thereof and the manner in which they operate to assemble carriers with containers, it will be seen that a succession of carrier members, of either the integral handle or finger hole variety, are interconnected in strip form designated 24, and suitably wound about the hub of a supply reel 52 rotatably mounted to the frame 54 of the machine. The reel 52 is equipped with a suitable retarding brake (not shown) to prevent overrunning of the reel as the strip 24 of interconnected carriers are pulled therefrom. The retarding brake is connected to the driving mechanism of the machine such that when the drive motor is energized, the brake will be released.

The infeed of the strip 24 is accomplished by three rolls; a knurled powered overdriven steel roll 56, and two rubber idler rolls 58, 60. As best seen in FIG. 4, a pair of leaf springs 62, 64 mount the idler rolls 56, 58 in such a manner that the web or strip tension created by the rear idler roll 56 causes cooperative engagement of the strip with the forward idler roll 58 and the knurled powered roll 56 for feeding the same. After passing through this arrangement, the web will have a slack or minimum tension condition as it is moved through the machine.

The strip is then directed through a guide chute 66 which has an opening only slightly larger than the strip width and thickness, and is adjustable laterally of the strip movement to direct it in a prescribed path through the machine. The guide chute 66 rests atop the leaf spring 62, 64 and is partially supported by cross bars of the frame 54 and the depressor receiving member 172 to be later described.

After leaving the guide chute 66, the strip is moved over the carrier applying mechanism 70 which acts upon the carrier strip 24, in a manner to be described below, to apply it to containers 12 conducted through the machine in timed relation with the movement of the carriers. The containers are moved through the machine 10 by a container transporting mechanism 72, the major components of which include a pair of spaced, generally horizontally extending conveyor belts 74 which accept a double file procession of containers issuing from the container filling and closing machine, channel means 76 which maintains the containers on the conveyor belts 74 and directs them onto a flight conveyor mechanism 78 which segregates the containers in pairs and directs them through the machine. The container transporting mechanism moves pairs of containers in a continuous fashion along the upper run of the flight conveying mechanism 78 in a generally horizontal path. When the containers are moved beneath the carrier applying mechanism 70, they are maintained in nonshifting positions, as will be described in detail below, with the upper ends thereof in spaced and generally parallel relationship to the lower run of the carrier applying mechanism 70.

Before considering the carrier applying mechanism 70, it is believed that a description of the container transporting mechanism 72, in transporting containers through the machine 10, would be helpful in facilitating a general understanding of the machine. Accordingly, reference is made to FIGS. 1 and 4–6 of the drawings which depict the container transporting means 72 of the present invention. As previously indicated, the machine 10 of the present invention is particularly suited as an attachment to a container filling and closing machine, and as a result, has a pair of spaced conveyor belts 74 which accept a double file incoming procession of containers emanating from a container filling and closing machine. The belts 74 may either be positioned adjacent the discharge end of the container filling and closing machine or if preferred, the belts 74 may be connected directly with the container filling and closing machine. Each of the conveyor belts 74 are continuously driven in an endless path by the conveyor belt drive means 76, FIGS. 1, 4 and 5, which are operatively associated with a common drive means of the machine as will be described more fully below. The conveyor belts 74 are, in the preferred form, driven at a greater speed than the flight conveying mechanism 78 so as to enable line pressure of the conveyor belts to push the containers in the pockets of the flight conveying mechanism.

As seen in FIG. 1 of the drawings, one of the conveyor belts 74 is shown as being entrained about the belt drive means 75 and an idler drive member 73, each of which is suitable journaled in appropriate mountings supported by the machine frame 54. The idler member 73, as previously discussed, may be part of the container filling and closing machine. As illustrated in FIG. 1 of the drawings, a horizontally positioned belt supporting bar 80 is supported by the machine frame 54 and underlies the upper run of each conveyor belt 74 to support the containers 12 as they are moved by the conveyor belts 74.

Each of the conveyor belts 74 has associated therewith a channel means 76 spaced upwardly from the upper run thereof for receiving and maintaining the containers on the conveyor belts. In the form shown in the drawings, each of the channel means 76 comprises a pair of spaced, vertically arranged inner and outer channel members 82, 84 respectively. Each pair of inner and outer channel members 82, 84 are positioned above one of the conveyor belts 74 in generally coplanar relationship with each other to define a channel 86 therebetween of generally the same width as the conveyor belts. As illustrated in the drawings, each of the outer channel members 84 are generally L-shaped in cross section, and are suitably fixed, as are the generally rectangularly shaped inner channel members 82, to elements of the machine frame by welding, fastening, or the like.

The inner and outer channel members 82, 84 extend, for the major portion of their length, in generally parallel, aligned relationship with the conveyor belt with which it is associated. It will be seen in FIGS. 4 and 6, however, that each pair of channel members 82, 84 of each conveyor belt 74 converge toward each other adjacent one end of the flight conveying mechanism 78.

In FIG. 5 it will be seen that as the channel members 82, 84 associated with each conveyor belt 74 converge toward each other, the outer members 84 traverse the width of the belt so as to, in effect, provide a positive stop for the containers as well as a directing and orienting means for the containers. The inner channel members 82 close the gap between the spaced conveyor belts 74, and overlie one end of the flight conveying mechanism as best seen in FIG. 5 of the drawings. Containers 12, which are moved along each conveyor belt 74, are thus caused to be moved through the discharge opening 88, formed by the converging sections of the members 82, 84, and onto the flight conveying mechanism 78.

The flight conveying mechanism 78 is here illustrated as comprising a pair of endless chains 90, FIG. 4, which are entrained about first and second pairs of sprocket wheels shown in FIGS. 1 and 6, and designated 92, 94 respectively. A plurality of flat, generally rectangular slats 96, FIGS. 4–6, are attached by suitable means to every other chain link on the outer periphery of the chains 90. The slats 96 themselves, in turn, provide a suitable support for the upstanding elements 98 which are welded or otherwise secured to the slats 96 at generally right angular relationship therto. Adjacent pairs of upstanding elements 98 define container pockets or compartments 100, each of which are capable of receiving a pair of containers from the discharge outlets 88 of the channel means. A pair of separator devices 102, extending in opposite directions from each upstanding element 98, subdivides each pocket or container receiving compartment 100 into two parts for receiving the containers in pairs.

As best seen in FIGS. 4–6 of the drawings, one end of the flight conveying mechanism is positioned intermediate the spaced conveyor belts 74 in the vicinity of the discharge outlets 88 so that containers 12 will be moved from the belt conveyors 74 into the compartments or pockets 100 defined by adjacent pairs of upstanding elements 98. It is to be noted in comparing FIGS. 4–6 of the drawings that the flight conveying mechanism 78 is so designed that it moves through an arcuate path just prior to approaching the discharge outlets 88, and then levels off in a substantially horizontal path as it passes the discharge outlets 88. In this manner, the slats 96, upstanding elements 98 and separators 102 will be maintained below and out of engagement with the converging sections of the inner channel members 82, and yet will permit each of the slats 96 to be moved in a generally horizontal path which is even with the upper run of each conveying belt 74 for rapid transfer of the containers 12 from the conveying belts 74 to the flight conveying mechanism 78.

The distance between adjacent slats 96 is of a size sufficient to permit the placement of containers 12 thereon as shown in FIG. 5 of the drawings. Only a single container can be transferred from each conveyor belt 74 to one of the container pockets or compartments of the flight conveying mechanism as they pass the discharge outlets 88 associated with each conveyor belt 74. This is primarily due to the fact that the container compartments or pockets 100 are only capable of receiving one container at a time from each of the conveying belts 74, but it is also partially attributed to the upstanding elements 98 as they cooperate with the converging sections of the inner channel members 82 to prevent container transfer until a container pocket or compartment is aligned with the discharge openings 88. The containers 12 are moved in pairs into the assembly zone beneath the carrier applying mechanism 70 and in timed relation therewith. The flight conveying mechanism 78 in the area beneath the carrier applying mechanism 70 directs the containers in a substantially horizontal path with the upper ends of the containers in spaced and generally parallel relationship to the lower run of the carrier applying mechanism. This horizontal path of the flight conveying mechanism 78 corresponds generally with the assembly zone of the machine, and thus it is important that the containers are prevented from any movement in this area. For this purpose, the finger extensions 104 of the outer channel members 84 extend on opposite sides of the flight conveyor mechanism 78 in generally parallel relationship with each other, and project a slight distance above the upper surface of each slat member 96 as seen in FIG. 1, so as to maintain the containers 12 confined in the pockets or compartments 100 as they pass through the assembly zone.

As the containers 12 are moved in this substantially horizontal path, the elongated strip 24 of interconnected carrier members is applied thereto by the carrier applying mechanism 70 in a manner to be discussed below. After the assembly of the containers with the interconnected carriers of the strip 24, the flight mechanism 78 drops or moves out of supporting engagement with the containers 12, as best seen in FIGS. 4 and 6, the support to the containers and carriers then being transferred to the horizontally extending support bar 106 mounted to the machine frame 54 adjacent the discharge end thereof. As the flight conveyor mechanism 78 is moved away from the containers 12, each of the upstanding elements 98 will spread adjacent containers a distance X which is greater than the distance Y between adjacent containers when assembled to carrier members, and which is sufficient to cause separation of adjacent carrier members from each other along the readily fracturable connecting webs 26 in the manner previously discussed. Thus, each upstanding element 98 will exert opposing forces on adjacent containers in each container row, this force being sufficient to separate adjacent carriers from each other in the vicinity of the connecting web 26.

The flight conveyor mechanism then proceeds downwardly away from the discrete package units, and support of the package units is transferred to the frame mounted supporting bar 106 which has a length sufficient to permit the container bottoms to clear the flight conveyor mechanism. When this occurs, the packages 18 or 20 can then be transferred to a suitable product receiving platform or conveyor 108, and further assembled, in the usual case, in case lots by suitable packaging machinery (not shown) which is commercially available.

Reference is now made to FIGS. 1, 4, 7–10 and 11 for a specific description of the carrier applying mechanism 70. This mechanism, which is also driven by the common drive means as will be discussed in detail below, also has a pair of endless chain members 110 which are entrained about first and second pairs of spaced sprocket wheels designated 112, 114 respectively. Each of the pairs of sprocket wheels 112, 114 are suitably secured to shaft elements 113, 115 respectively which are journaled in conventional fashion to journal mounts supported by the machine frame 54. In comparison to the flight conveyor mechanism 78, however, the endless chains 110 are spaced at greater distances from each other than the endless chains 90, and are designed to move through a generally elliptically shaped path. Spanning the distance between the spaced endless belts 110, and attached to every other chain link of each chain 110 are a plurality of flat, generally rectangular slotted tie-bars 116. Mounted atop each of the tie-bars 116 are first and second pairs of carrier applying means 118, each of which are provided with a pair of pin elements 120 which are adapted to transcribe arcuate paths on each of the tie-bars 116 as they are moved in the closed elliptically shaped path defined by the movement of chains 110.

As illustrated in FIG. 10 of the drawings, each tie-bar 116 and carrier applying means 118 is constructed in the manner now to be described. Each slotted tie-bar 116 is provided, on opposite sides of a depressor plate 122 secured thereto in a generally central position, with inner and outer elongated slots 124, 126 respectively. The outer slots 126 are substantially larger than the inner slots 124 for reasons which will become apparent hereinafter, and are each adapted to receive a pivotal and sliding mount for a first pair of elongated arms designated 128, 130.

These arms are identical with each other, and one of them is merely inverted when they are assembled to each other.

Adjacent one end of the arms 128, 130 there is provided openings 132, 134 respectively which are adapted to be aligned with each other for receiving the threaded stud member 136. Each of the arms 128, 130 are pivotally assembled to each other by first inserting the threaded stud member 136 through one of the elongated slots 126, and then through the apertures 132, 134 for threaded engagement with the nut member 140. In this manner, the arms 128, 130 are suitably secured to each other for relative pivotal displacement therebetween as they are moved in various angular positions along the length of the outer slot 126. A roller bearing 138 is secured to each stud member 136 on the lower face of the tie-bars 116, and is adapted to ride in a cam track arrangement. Thus, it has the function of a cam follower as will become more apparent in the discussion that follows.

Each of the carrier applying means 118 also has a second pair of arms 142, 144 which are pivotally secured to the outer ends of the arms 128, 130 by the pin elements 120. As seen in FIG. 10, the pin elements 120 each have a lower bulbous portion 122 which are adapted to be received by one of the openings in second arm 142, and one of the openings in first arm 130 so that a larger arm overlies a smaller arm on one side of each carrier applying means 118, and a smaller arm overlies a larger arm on the other side of each carrier applying means. The openings in the arms 142, 130 which are adapted to receive the bulbous lower portions 122 of the pin elements 120 permit free pivotal displacement of the pin elements such that the angular relationship between arms 130, 144 and arms 128, 142 can be varied.

Figure 7:
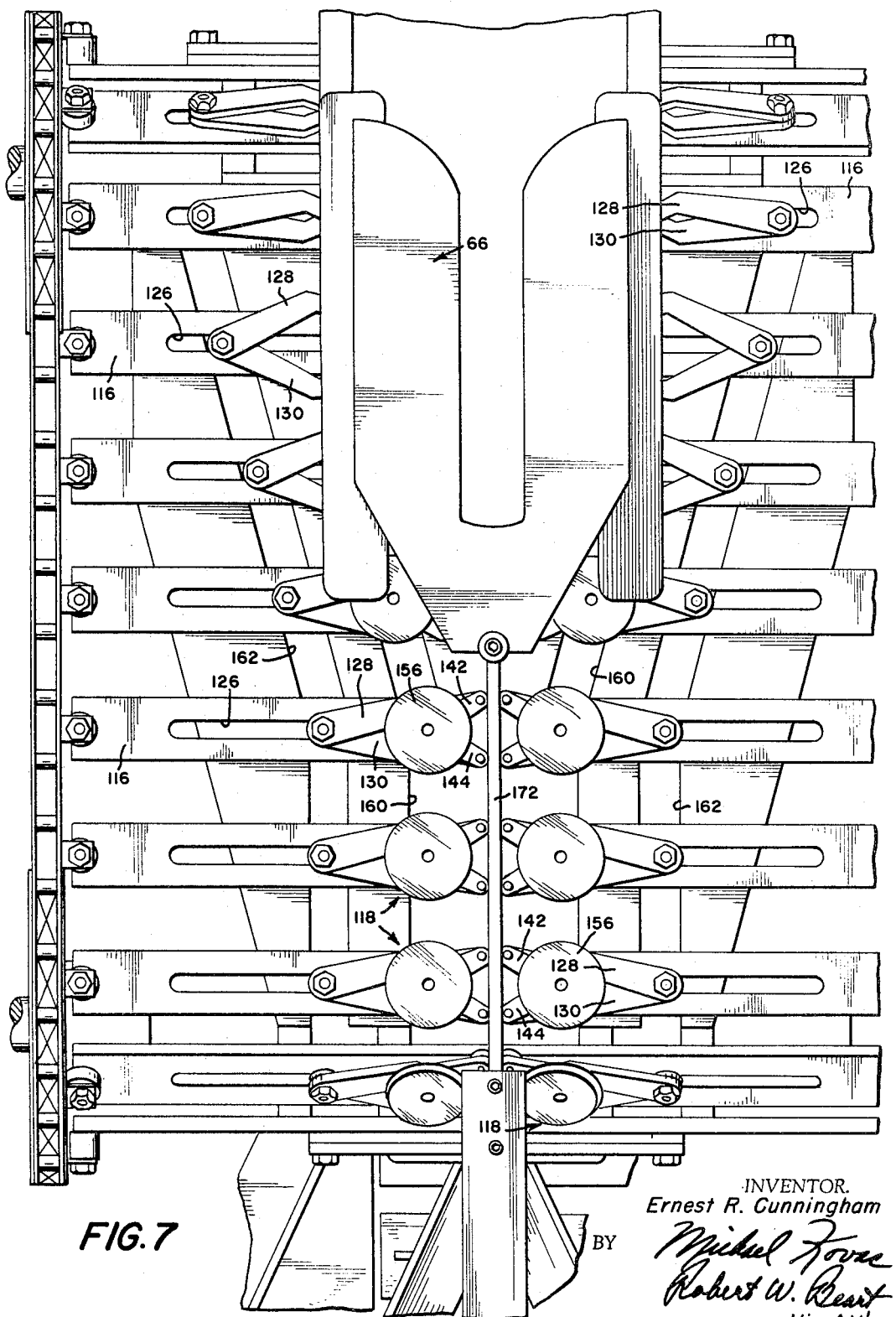
FIG. 7 is a fragmentary top plan view of the machine shown in FIG. 1 of the drawings in the vicinity of the carrier assembly mechanism.

The other end of the arms 142, 144 are pivotally mounted to each other by a threaded stud member 146, also having a roller bearing 148 associated therewith, which projects upwardly through openings 150, 152 of arms 142, 144 respectively. The stud member 146 is threadably engaged with the threaded opening 154 of the circular plate 156 which rests atop the smaller, second pair of arms 142, 144 for a large portion of their length. The circular plate 156 is not used as a cam for the pins 120 as it will be recognized that the particular linkage arrangement is what actually causes the pin elements 120 to transcribe predetermined arcs as will be described below. It has been found, however, that the circular plates 156 prevent the apertured carrier members from being hung up on any sharp corners or projecting portions of the linkage arrangement. This is best seen in FIG. 7 of the drawings.

The roller bearings or cam followers 138, 148 for each carrier applying means 118 are adapted to ride in continuous closed cam tracks mounted inside the closed path of the moving tie-bars 116 to control pin position and movement. As best seen in FIG. 7 of the drawings, these cam tracks are mounted immediately adjacent the tie-bars 116 and comprise inner and outer tracks 160, 162 for each pair of pin elements 120. The cam tracks are arranged in generally opposing, mirror image relationship in like manner to the first and second pairs of pin elements 120 mounted on each tie-bar. Those portions of the cam tracks 160, 162 visible in FIG. 7 of the drawings include only such portions which are positioned immediately below the upper run of the endless carrier applying mechanism. As the cam tracks have closed paths, it will be appreciated that the arcuate side portions and the lower run of the carrier applying mechanism 70 will also have portions of the cam tracks associated therewith.

Figure 9B:
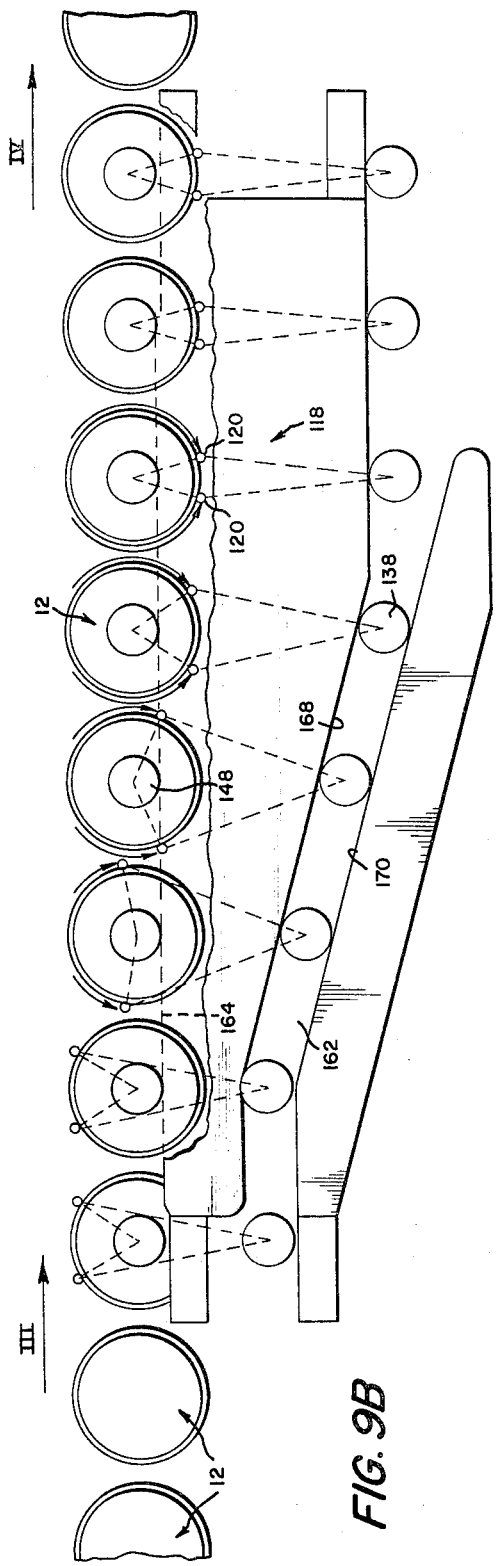
FIGS. 9A–9B are fragmentary semi-diagrammatic views showing the various relative positions of the carrier applying means as they are readied for engagement with a carrier strip, and thereafter moved in a prescribed fashion to effectuate telescopic assembly between containers and carrier members.
Figure 9A:
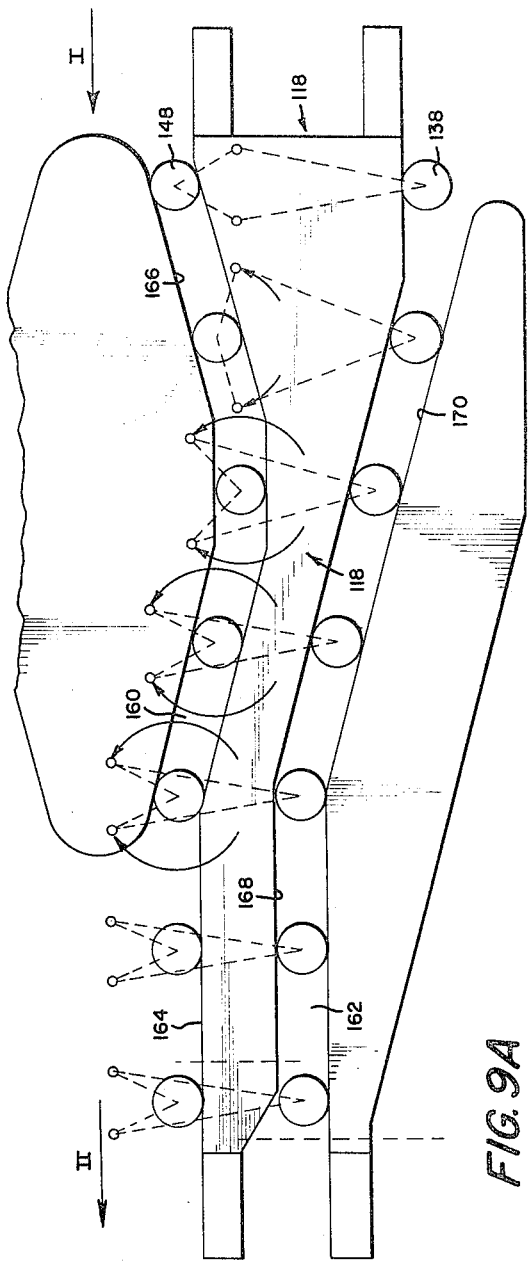

Reference is now made to FIGS. 9A–9B of the drawings which show diagrammatic positions of various elements in each carrier applying means 118 as they are moved along inner and outer cam tracks 160, 162. It will be appreciated that the following discussion relates only to one-half of the apparatus, and that the other half will operate in the same manner. The cam tracks 160, 162 shown in these figures represent those portions which would be visible in a top and bottom plan view of one-half of the apparatus. Each of the cam tracks 160, 162 has an uninterrupted cam surface, and an opposing cam surface for at least a portion of the uninterrupted cam surface. In particular, the cam track 160 has an uninterrupted cam surface 164, and an opposing cam surface 166 which is in opposing relation to cam surface 164 for a portion of its length, while the outer cam track 162 has an inner uninterrupted cam surface 168 which, for a portion of its length, is opposed by the outer cam surface 170. This particular arrangement is merely illustrative of one way in which the cam tracks may be formed, and it will be recognized that opposing cam surfaces can be provided for larger or smaller portions of the cam tracks as necessary and desired.

The inner cam track 160 is adapted to receive the roller bearing or cam followed 148 of each carrier applying means 118, while each roller bearing or cam follower 138 is adapted to be positioned in the outer track 162. The cam tracks are so shaped that they move the cam followers 138, 148 toward each other as they travel from station I to station II in FIG. 9A to position and hold the arms (shown in dotted lines) of each carrier applying means 118 in folded relationship as they approach station II. Each carrier applying means 118, as it moves between stations I and II, has its arms moved from a relaxed position to a folded position to cock or ready the pin elements 120 thereof for movement in applying the apertured carrier members to the containers. As each of the carrier applying means 118 reach station II, they would have reached the extreme right-hand position of the carrier applying mechanism upper run as viewed in FIG. 1, just prior to moving along the curvilinear side portions of the carrier applying mechanism. It is to be noted that the cam tracks remain essentially constant as the carrier applying means 118 is moved over the curvilinear side portions of the carrier applying mechanism 70.

When each of the carrier applying means 118 reach station III, they are ready to begin to apply the apertured carrier members to the containers. At this point, it should be recognized that the apertured carrier members will already have been inserted over the pin elements 120 of each carrier applying means and maintained in cooperative relationship therewith by suitable means to be discussed below so that when each carrier applying means 118 is moved adjacent to a container, and then moved in timed relationship therewith through the assembly zone, the pin elements 120 of each carrier applying means 118 will transcribe or generate arcs on opposite sides of each container from station III to station IV. It is to be noted that as the containers 12 and pin elements 120 of each carrier applying means move linearly in synchronization, the outer cam track 162 diverges away from cam surface 164 of the inner cam track. The effect of this is in that the pin elements 120 of each carrier applying means 118 will generate or transscribe arcuate paths on opposite sides of each container. With the central portion 38 of each carrier positioned intermediate the two container rows below a plane passing through the upper ends of said containers by depressor means now to be described, the apertured carriers will be progressively applied to the containers.

As previously indicated, each tie-bar 116 has a fan-shaped depressor plate 122 mounted upwardly and in a generally centrally located position thereof. Each of the depressor plates 122 cooperate with the recessed member 172 (see FIGS. 4 and 8) in forming the strip 24 in an inverted V-shape as the strip leaves the guide chute 66 so that when the strip is fed from the upper to the lower run of the carrier applying mechanism 70, the depressed or deflected portion will be positioned intermediate the container rows beneath a plane passing through the upper ends of each container. The depressor plates 122 then act to hold the depressed or deflected area of the strip which, in the illustrated form of the invention, is the central web portion 38 to aid in progressively applying the carrier strip on the containers.

Reference is now made to FIGS. 8, 9A–9B and 11A–11C for a description of how each pair of pin elements 120 and the depressor plate 122 for each carrier applying means 118 coact to progressively apply carrier members to containers.

FIGS. 11A–11C show three positions of one set of pin elements 120 and a depressor plate 122 along the lower run of the carrier applying mechanism 70 which would correspond, as depicted in FIG. 9B, to their relative positions at station III, station IV and a point midway therebetween. The coaction between the depressor plate and the first and second pairs of pin elements 120 will become apparent by referring to FIGS. 11A–11C. FIGS. 9A–9B show the precise positions of the pin elements 120 throughout the machine cycle, and FIG. 8 is most helpful in understanding the relationship between the pin elements 120 and the carrier strip 24 throughout the machine cycle.

As the carrier strip 24 leaves the guide chute 66 as seen in FIG. 8 of the drawings, the depressor plate 122 of each tie-bar 118 will force the central web portion 38 of each carrier member upwardly into the complementary U-shaped recess of member 172. It will be remembered that the guide chute 66 is laterally adjustable of the carrier strip 24 so that it can be adjusted, if necessary, to position the central web portion 38 of the carrier member in alignment with each depressor plate 122. As the depressor plates 122 proceed along the U-shaped channel of the recessed member 172, the web or strip 24 will be formed in an inverted V-shape, and this will cause the pin elements 120 to be inserted into the container receiving apertures of the carriers. The strip 24 of carriers is maintained in this inverted V position until the central web portion 38 of each carrier is in position between the cans. This occurs just as the carrier applying means 118 begins to move along the lower run of the carrier applying mechanism 70 which would generally correspond to station III in FIG. 9B of the drawings.

When the carrier strip 24 is in the vicinity of station III, it will have a central web portion 38 positioned immediate a pair of containers 12 by a depressor plate 122 as shown in FIG. 11A. The pin elements 120 on each side of the depressor plate 122 are now moved in a continuous fashion to transcribe arcs on opposite sides of each container as best seen in FIG. 11B, in order to progressively enlarge each container receiving aperture until the material 36 adjacent thereto assumes the general shape of that shown in FIG. 11C of the drawings. Reference is hereby made to FIGS. 8 and 9A–9B which show the preicse position of pin elements 120 throughout the cycling of the apparatus.

It will be noted in FIG. 8 that when the pin elements 120 complete their movement around the periphery of the containers as seen in the extreme lower right of this figure, they will have completed their linear movement along the lower run of the carrier applying mechanism, and will begin to move upwardly in a curved path over the end or side portion of the carrier applying mechanism 70. In so doing, the pin elements 120 will effectually be withdrawn from engagement with the containers and carrier members so that they will be ready for engagement with the strip 24 as it issues from the guide chute 66. It will be apparent that the enlarged beads or chimes adjacent the upper ends of the containers will hold the carrier and containers assembled to one another as the pin elements 120 are withdrawn to provide the finally assembled package units as shown in FIGS. 2 or 3.

After the carrier strip is applied to the containers, the flight conveying mechanism 78 moves the assembled carriers and containers onto the supporting bar 106 as it diverges or drops away from the containers. As previously discussed, this dropping away of the flight conveying mechanism has the effect of spreading adjacent containers so as to separate the assembled carriers and containers into discrete package units by separating adjacent carriers along the weakened web connecting portions 26. Some of this separation may occur when the carriers are applied to the containers, but this will not affect the machine cycle as the carriers are maintained in predetermined positions by the carrier applying means 118, depressor member 172, etc. It is also possible to design the depressor plates 122 and the web connecting portions 26 such that the carriers will always be separated from each other when engaged by the depressor plates.

The drive means for effectuating the movement of the various components of the machine in timed relationship with each other will now be described. This drive means, as best seen in FIG. 1, includes a motor 180 which is connected to a variable speed device 182, the output shaft of which is connected by way of a sprocket wheel (not shown) to the sprocket chain 184. The sprocket chain 184 is entrained about an idler sprocket wheel 186, past a sprocket wheel (not shown) which drives the knurled powered roller 56, and then about sprocket wheels (also not shown) aligned with the sprocket wheels 94 and 114 of the flight conveying mechanism 78 and carrier applying mechanism 70 respectively. Thus, the sprocket chain 184 is operative from the motor to drive the knurled powered roller 56, the carrier applying mechanism 70, and the flight conveying mechanism 78 in timed relationship with each other. In addition to this, the conveyor belts 74 are driven by a sprocket wheel and chain arrangement 76 at the left-hand side of the flight conveying mechanism 78 in FIG. 1 of the drawings. It will be noted that the sprocket wheel 188 of this arrangement is larger than the sprocket wheels 92 which drive the chains 90 of the flight conveying mechanism 78 as well as the smallest sprocket wheel 192 which coacts therewith. An endless chain 190 is entrained about the sprocket wheel 188, also about sprocket wheel 192 which is secured to the same shaft that supports the belt drive member 75. As the sprocket wheel 192 is smaller than sprocket wheel 188, and the sprocket wheels 92 which drive the flight conveying mechanism 78, it will drive the conveyor belt 74 at a speed greater than the flight conveying mechanism 78 so that the line pressure of the conveyor belt 74 will push the containers against the upstanding elements at the front of each of the flight pockets 100 until the following flight prevents pressure transmission. This assures continuous movement of containers 12 into the pockets of compartments 100 of the flight conveying mechanism 78 for proper synchronous movement of the containers with the carriers into the assembly zone.

One of the important features of the present invention is the manner in which the pin elements 120 cooperate with the depressor plate 122 in progressively applying the carrier strip on each of the containers. As just discussed, the depressor plate 122 of each carrier applying means 118 depresses a central web portion 38 of each carrier member while the pin elements 120 progressively stretch container receiving apertures of carrier members beginning adjacent the depressor plate 122 in order to effectuate telescopic assembly of the containers and carrier members. This progressive application concept is similar to that of placing a vehicle tire on a drop center rim, and results in minimum stretching of the material adjacent the container receiving apertures. As each of the carrier members are made of resilient, deformable and elastic material such as polyethylene, and the material adjacent each container receiving aperture is held to a minimum for economic reasons, it is important that each container receiving aperture is subjected to minimum stretching or enlargement, and this is attained by the coaction between the depressor plates 122 and pin elements 120 as discussed. The central web portion 38 of each carrier may be pre-scored without weakening the carrier as at 25 in FIGS. 4 and 12 to aid in central bending of the same by the depressor plates 122.

The machine 10 is capable of operating at a minimum speed of 600 cans per minute, the desired operating range varying from 700 cans per minute for softdrinks to 1200 cans per minute or greater for beer. Not only are the carrier applying and flight conveying mechanisms 70, 78 respectively capable of being driven at high speeds, but the synchronized movement of a portion of these members along a linear path in the assembly zone as carriers are applied to containers will result in a very high production rate of carrier package units. In addition, this is accomplished without a great number of operating mechanisms or parts, as will become obvious by comparing the apparatus of the instant invention with machines previously developed.

Various types of testing or sensing mechanisms can be employed to temporarily inactivate the machine operation. As an example, a detector mechanism for each container lane may be provided, such a pivoting limit switch arrangement, which engages the top of the containers to keep the various operating components of the machine running if containers are continuously supplied to the conveyor belt 74, but which will pivot in a downward direction to activate a machine stop switch if not held at a predetermined level by a continuous procession of containers. A similar arrangement can be provided on the discharge side of the machine. It is also possible to employ a detecting mechanism which will sense the presence or absence of a carrier strip 24 at one or more positions of the carrier applying mechanism 70. These detecting or sensing mechanisms are merely supplementary to the overall machine operation, and do not affect the machine operation other than stopping or starting the same.

It is a relatively simple matter to effect conversion of the machine to containers of larger or smaller diameter by simply changing the length of the small arms 142, 144, the spacing between adjacent tie-bars 116, and the number of links for the chains 110. In such a case, the flight conveying mechanism 78 would, by necessity, have to be altered to correspond with changes made in the carrier applying mechanism 70, but this as will be apparent, will be limited to varying the number of chain links for the chains 90. This indicates the adaptability of the present apparatus to various sized containers.

As previously discussed, either the finger hole carrier 14 or the integral handle carrier 16 may be used in the apparatus of the present invention depending on the dictates of the customer. Where an integral handle carrier 16 is used, it is necessary to provide additional means for severing the readily fracturable connecting webs 50 joining each handle strap 44 to the inwardly directed portions adjacent a pair of opposed apertures as seen in FIG. 12. This means can take the form of a vertically moving knife which is operated by, for example, the idler sprocket shaft 186, and which is designed to make one revolution per package unit to sever the webs 50 and push the handle strap 44 from the plane of the carrier to a position spaced upwardly therefrom.

It is to be understood that the invention described and illustrated by FIGS. 1–12 of the drawings is merely one exemplary embodiment, and that other forms and variations are possible. As an example, a modified form of carrier applying mechanism is shown in FIGS. 13–15 of the drawings, and includes modified carrier applying means and means for operating the carrier applying means. Succinctly stated, the modified form of invention shown in FIGS. 13–15 includes a plurality of pairs of spring arms mounted in a yieldable fashion to a pair of spaced endless conveying mechanisms, the lower runs of which diverge away from each other to move pin elements attached to the spring arms in a carrier applying fashion, while the upper runs of each of the conveying mechanisms converge in an opposite direction to the general divergence of the lower runs to ready the spring arms for subsequent carrier applying cycles.

With greater particularity, it will be seen that the modified form of carrier applying mechanism shown in FIGS.

13–15, and generally designated 200 will be used in connection with the container infeed mechanism generally designated 72 in FIGS. 1–12. Carrier applying mechanism 200 includes a pair of spaced endless conveying mechanisms 210 which are preferably of the bow chain variety so as to permit limited lateral bending or deflection of the chains. Only one of such chains 210 is shown in FIG. 15 of the drawings, it being understood that in applying carrier members as heretofore discussed in assembled relation with containers 12, a pair of conveying mechanisms or endless chain members 210 will be provided. As best seen in FIG. 15 of the drawings, each of the endless conveying mechanisms or chains 210 has upper and lower runs 212, 214 respectively over which the carrier applying means 216 operates.

In FIG. 13 of the drawings, a plurality of carrier applying means 216 are shown as being attached to links 218 of the chain conveying mechanism 210. The view as seen in FIG. 13 is that which would be seen when looking upwardly from a position below the lower run 214 of one of the chain conveying mechanisms 210. It is to be understood that the carrier applying means 216 shown in FIG. 13 of the drawings are spaced apart at distances greater than would normally be the case, and that the spacing between adjacent carrier applying means 216 is similar to the spacing between the carrier applying means 118 in FIGS. 1–12 embodiment.

The chain conveying mechanisms 210 are driven by sprocket wheels 213, 215 in a manner similar to that discussed in connection with the FIGS. 1–12 embodiment. Each of the chain conveying mechanisms 210 is preferably of the bow chain variety, and thus is capable of limited lateral flexing or movement in a path such as shown in FIG. 15 of the drawings. The chain conveying mechanisms 210 are directed in such paths by the chain bearing blocks 220 as best seen in FIGS. 13–14. These chain bearing blocks 220 cause the flexible chain conveying mechanisms 210 to move in diverging paths along the lower run 214 of the container, and then in converging paths along the upper run of the container in much the same manner as the cam track-cam follower arrangement of the FIGS. 1–12 embodiment.

Each of the carrier applying means 216 is secured to one of the chain links 218 of the chain conveying mechanism 210 as is shown in FIG. 14 of the drawings. A supporting plate 222 is secured by welding or otherwise to the lower portion of one of the chain links 218. This supporting plate 222 supports a threaded stud 224 which is adapted to extend through the helically wound coils of the sear spring 226. A nut member 228 engages the threaded portion of stud member 224 and secures the sear spring 226 in a fixed position thereon. Suitable flat plate washers 225, 227 may be used to provide a suitable surface against which the helical coils of the sear spring 226 abut. Each sear spring 226 has a pair of spring arms 230, 232 respectively which are normally urged to a position such as seen in the extreme right in FIG. 13 of the drawings. At the free extremity of each of the spring arms 230, 232, there is provided a pin element 234 which coact with the depressor plate 236 in applying carriers to containers in generally the same fashion as the FIGS. 1–12 embodiment.

More particularly, and as seen in FIG. 13 of the drawings, each of the spring arms 230, 232 for each carrier applying means 216 are capable of transcribing arcs on opposite sides of the containers 12 by following the outline of the containers. As each of the carrier applying means 216 is moved from left to right as seen in FIG. 13 of the drawings, the chain conveying mechanism 210, which diverges away from the containers 12, causes the pin elements 234 of the spring arms 230, 232 to engage the outer surface of the containers 12 and move in an arcuate fashion much in the manner as the pin elements 120 of the FIGS. 1–12 embodiment. Each of the spring arms 230, 232 of each carrier applying means 216 and the pin elements 234 thereof are withdrawn from contact with the carriers and containers in the same manner as the FIGS. 1–12 embodiment after they have applied carrier members to containers.

This much simplified arrangement eliminates much of the cost in producing as well as operating carrier applying mechanisms heretofore known, and without sacrificing reliability or dependability of operation. If desired, it is possible to incorporate a spring arm type of carrier applying means identified 216 in FIGS. 13–15 in connection with the cam track arrangement of FIGS. 1–12. In such a case, it will be necessary to provide a cam follower or the like for the spring arm variety of carrier applying means for movement by the cam track arrangement as will be apparent. It is to be understood that the method and apparatus of the present invention are by no means limited to any of the structural arrangements or modes of operation disclosed herein as it will be apparent that many modifications thereof are possible which come within the purview of the present invention.

*Operation*

The machine and method described in connection with FIGS. 1–12 operates in the following manner:

A double file procession of containers 12, which may emanate from a container closing and filling machine, are fed along the upper runs of the spaced conveyor belts 74 as best seen in FIG. 4. The containers 12 are directed through discharge outlets 88 at the rear ends of the conveyor belts into the pockets or container receiving compartments 100 of the flight conveying mechanism 78 for movement of containers, traveling two abreast, in a horizontal path across the upper run of the flight conveying mechanism 78. While the pairs of containers 12 are moving in this horizontal path, apertured carrier members are assembled thereto by the carrier applying mechanism 70 which is endless in form like the flight conveying mechanism 78. A strip 24 of interconnecting carriers is moved across the upper run of the carrier applying mechanism 70 through a guide chute 66 which positions the strip in a predetermined path. After passing through the guide chute 66, the strip is formed into an inverted V by depressor plates 122 and the recessed member 172 to insert a pair of pin elements 120 into each container receiving aperture of the carrier. Further movement of the strip 24 over the carrier applying mechanisms to a position at the beginning of the lower run thereof will cause the strip to assume a shape generally of the type seen in FIG. 11A of the drawing wherein the central web portion 38 is positioned intermediate each pair of containers below a plane passing through the upper ends thereof.

Each pair of pin elements 120 associated with each carrier applying means 118 is moved in an arc transcribing or generating fashion on opposite sides of each container by the cam follower-cam track arrangement previously described, to progressively enlarge or stretch each container receiving aperture for telescoping engagement with corresponding containers as best seen in FIGS. 8 and 11B–11C.

Discrete package units are formed by severing adjacent containers along the weakened connecting webs 26, and this is preferably accomplished by causing the flight conveying mechanisms 78 to diverge away from the assembled containers and carriers as best seen in FIG. 6 of the drawings, to spread adjacent containers from each other a distance sufficient to cause separation of adjacent carriers in the vicinity of the weakened web 26. Support of the packages as the flight conveying mechanism 78 drops therefrom is transferred to the supporting bar 106 until the packages are moved by line pressure onto the product receiving platform or conveyor 108.

The modification of the carrier applying mechanism as shown in FIGS. 13–15 operates generally in the same manner and on the same principles as the FIGS. 1–12 embodiment with the exception that the pin elements 234 are mounted on pairs of spring loaded arms 230, 232, and the chain conveying mechanisms 210, upon which the pairs of arms 230, 232 are mounted, are capable of lateral movement for actuating the pin elements in carrier applying fashion.

From the foregoing, it will be appreciated that the present invention contemplates a new and improved method and apparatus for assembling containers and carriers into packages convenient for carrying. A relatively small number of operating mechanisms or steps are used without sacrificing speed or efficiency of assembly, and the carriers are handled in a fashion which takes into consideration the carrier material and design. It will also be apparent that an improved carrier device and strip have been disclosed herein.

Various changes in structure and method will no doubt occur to those skilled in the art, and are to be understood as forming a part of the invention insofar as they fall within the spirit and scope of the appended claims.

What is claimed is:

1. A machine for assembling a group of containers with an elastic carrier member having a like number of apertures therein smaller than said containers comprising, means for arranging said group of containers in side by side relationship with the upper ends thereof in substantially abutting relationship, means for supporting said elastic carrier member adjacent the upper ends of said containers, means for holding a marginal portion of each container receiving aperture adjacent to a corresponding container and below a plane passing through the upper end thereof, and means for progressively stretching each container receiving aperture beginning adjacent the held marginal portion thereof whereby to effectuate telescopic assembly of said containers and carrier member.

2. The machine as set forth in claim 1 including means for moving said containers and carrier member in superimposed generally spaced and parallel paths to each other during assembly thereof.

3. The machine as set forth in claim 2 wherein said containers are moved in a continuous procession along a first path and said elastic carrier member is part of a succession of carrier members mounted for movement in a second path spaced from, but generally parallel to the upper ends of said containers, and means for separating each carrier member assembled to containers to form discrete carrying packages.

4. The machine set forth in claim 1 wherein said means for holding a marginal portion of each container receiving aperture of said elastic member and said means for progressively stretching each container receiving aperture of said elastic member are mounted on the same support means.

5. The machine as set forth in claim 1 wherein said means for progressively stretching each container receiving aperture of said elastic member includes a plurality of pairs of pin elements each capable of transcribing arcs on generally opposed sides of a container to enlarge the corresponding container receiving aperture with which it is to be associated.

6. The machine as set forth in claim 1 wherein said group of containers are arranged in two substantially parallel rows and said elastic carrier member is provided with pairs of juxtaposed rows of apertures generally corresponding with said container rows, said means for holding a marginal portion of each container receiving aperture below the upper ends of said containers being adapted to engage portions intermediate said juxtaposed rows of apertures to move the same between the substantially parallel rows of containers.

7. A machine for assembling a group of containers each having a radially extending enlargement in the vicinity of the upper end thereof with an elastic apertured carrier member comprising means for arranging said group of containers in side by side relationship with the enlargements thereof in substantially abutting relationship, means for positioning said elastic apertured carrier member adjacent the enlargements on said containers with the apertures thereof in generally aligned relationship with said containers, means for holding a marginal portion adjacent each container receiving aperture beneath the radially extending bead of the container with which it is to be associated, and means for progressively enlarging the marginal portions surrounding each container receiving aperture whereby to move said carrier member into telescoped relationship with said containers beneath the radial enlargements thereof.

8. A container package forming attachment for use with a container filling and capping machine comprising, means for directing a continuous procession of containers in a first path, means for moving a successive series of apertured carriers each having a plurality of container receiving apertures in a second path parallel to and spaced from the upper ends of said containers, means for holding marginal portions associated with each container receiving aperture beneath the upper end of the container with which it is to be associated, means for progressively stretching the remaining marginal portions surrounding each container receiving aperture to move the carriers and containers toward each other into assembled relationship with each other, and means for separating said carriers from the successive series of said apertured carriers.

9. For use with a container filling and closing machine, an attachment for assembling containers into a succession of discrete carrier packages comprising, means for directing a plurality of containers in two substantially parallel rows of containers each along a selected and predetermined path, means for feeding in adjacent relationship to the tops of said containers and in timed relationship therewith an interconnected succession of apertured elastic carriers each provided with a pair of juxtaposed apertured rows corresponding generally with the spacing between the container rows, said feeding means positioning the apertures of said carriers in generally aligned relationship with said containers, means for deflecting a marginal portion of said carrier strip intermediate said juxtaposed rows of apertures between the substantially parallel rows of containers, means for progressively stretching the material adjacent each aperture as said carriers and containers are moved into telescoped and assembled relationship, and means for separating successive carriers from the interconnected strip to form discrete carrier packages.

10. A container package forming attachment for use with a container filling and capping machine comprising, means for directing a continuous procession of containers in a first path, means for moving an interconnected series of container carriers each having a plurality of container receiving pockets in a second path generally parallel to and spaced from the upper ends of said containers, means for progressively stretching the marginal portions surrounding each container receiving pocket to move the carriers and containers into assembled relationship with each other, said inner connected series of container carriers being joined to each other across weakened severable areas and means for separating carriers from the interconnected series to form container packs including means for tearing said carriers from each other along said weakened areas.

11. A container package forming attachment according to claim 10 wherein said means for tearing individual carriers from each other includes means for increasing the distance between adjacent containers to exert opposing forces on adjacent carriers in the vicinity of the weakened portions.

12. A container package forming attachment according to claim 10 wherein said means for separating carriers from the interconnected series is operative both during and after assembly of said carriers to containers.

13. A container package forming attachment according to claim 10 wherein said means for separating carriers from the interconnected series is operative only after assembly of said carriers to containers.

14. A container package forming attachment according to claim 10 wherein said means for separating carriers from the interconnected series is operative only during assembly of said carriers and containers.

15. Apparatus for assembly containers into discrete carrying packages comprising, means for directing a succession of containers along a predetermined path, means for transporting a successive series of apertured carrier members each defining a plurality of container receiving apertures adjacent to, but spaced from the upper end of said containers, said containers and carriers being moved in timed relationship with each other, means for deflecting portions of the margins of carriers surrounding each container receiving aperture beneath the upper ends of said containers, means including a pair of pin elements for each container receiving aperture adapted to transcribe arcs on opposite sides of each container as said carrier apertures are moved toward said containers for progressively enlarging said container receiving apertures to facilitate the assembly of carriers to containers without undue stretching thereof, and means for separating successive carrier members from each other.

16. A machine for assembling containers into carrying pacakges comprising, means for moving a plurality of containers continuously in two substantially parallel rows, means for feeding in timed relationship with said containers a plurality of successively positioned elastic carrier members each having a plurality of container receiving pockets arranged in two juxtaposed rows, said carrier members being positioned adjacent the upper ends of said containers with the container receiving pockets aligned therewith, and means for assembling said containers and carrier members to each other including a plurality of pairs of pin elements arranged to move in a closed path at least part of which is similar to and coordinated with the container path, each pair of pin elements adapted to be positioned in one of the container receiving pockets of said carrier members, depressor means adapted to deflect a central portion of said carrier members between the container rows and downwardly spaced from the upper end thereof, means for causing each pair of pin elements to transcribe an arc on opposite sides of each container whereby said depressor means and pin elements coact to progressively apply the carrier members to containers, and means for separating said successively positioned carriers from each other to form individual carrying packages.

17. In a machine for assembling containers into carrying packages the combination of a first endless conveyor belt having a plurality of discrete container compartments each capable of receiving and transporting a pair of containers along the upper run thereof, a plurality of first and second pairs of pin element mounted in generally opposed relationship to each other on a second endless conveyor belt positioned in vertically spaced relationship above said first endless conveyor belt, means for driving said first and second endless conveoyr belts in timed relationship with each other, means for depositing on said second conveyor belt along the upper runs thereof an interconnected series of apertured carrier members each defining a plurality of container receiving apertures arranged in juxtaposed rows, means for feeding the interconnected series of apertured carrier members between said first and second conveyor belts, means for depressing a central portion of each apertured carrier member between each pair of containers with at least a portion thereof below the upper runs thereof, means for causing said pin elements within each container receiving aperture to transcribe an arc for enlarging the container receiving apertures to deposit the carrier members on said containers, and means for separating said interconnected carriers from each other to form carrying packs.

18. A machine for assembling containers into multipacks to facilitate carrying a plurality of containers comprising, a first endless conveyor belt having a plurality of container receiving compartments each capable of receiving at least one container along the upper run thereof, a second endless conveyor belt positioned in vertically spaced relationship above said first conveyor belt with the lower run thereof lying within a plane parallel to at least a portion of said first conveyor belt upper run, said second conveyor belt having a plurality of carrier applying elements mounted thereon, means for supplying to said second conveyor belt along the upper run thereof a succession of carriers each having a plurality of container receiving apertures, means for feeding said succession of carriers between said first and second conveyor belts, means for inserting said carrier applying elements into the container receiving apertures of said carriers, means associated with said carrier applying elements for moving marginal portions surrounding each container receiving aperture adjacent to and spaced downwardly from the upper end of said containers, means for operating said carrier applying elements to progressively expand each carrier aperture beginning adjacent the held marginal portion thereof, and means for separating the apertured carriers assembled to containers to form predetermined individual carrying packages including a multiplicity of containers.

19. A machine for assembling containers into packages for carrying comprising, a first endless conveyor belt having a plurality of discrete container receiving compartments each capable of receiving at least one container along the upper run thereof, a second endless conveyor belt positioned in vertically spaced relationship above said first conveyor belt with the lower run thereof lying within a plane parallel at least a portion of the first conveyor belt upper run, said second conveyor belt having a plurality of carrier applying elements mounted thereon, means for supplying of said second conveyor belt along the upper run thereof a succession of carriers each having a plurality of container receiving apertures, means for feeding the succession of carriers between the upper and lower rims of said first and second conveyor belts, means for inserting said carrier applying elements into the container receiving apertures of said carriers on the upper run of said second conveyor belt, means associated with said carrier applying elements for moving marginal portions surrounding each container receiver aperture adjacent to and spaced downwardly from the upper end of said containers, means for operating said carrier applying elements to progressively expand each carrier aperture beginning adjacent the held marginal portion thereof on the lower run of said second conveyor belt, and means for separating the apertured carriers from each other to form carrying packs.

20. A machine for assembling into carrying packages a procession of containers issuing from a container filling and closing machine or the like, comprising, in combination, means for supplying a continuous series of interconnected elastic carriers each defining a plurality of container receiving apertures smaller than said containers and being arranged in two juxtaposed rows, means for feeding the interconnected carriers through an assembly zone, means for arranging and directing the procession of containers in two substantially parallel rows through the assembly zone, carrier assembly means mounted for movement at said assembly zone adapted to accept the series of interconnected carriers, form the interconnected carriers in an inverted V between the container rows as the containers and carriers are moved through the assembly zone and progressively enlarge the container receiving apertures of respective carriers for assembling said carriers and containers, and means for separating carrier members from each other to form individual carrying packages.

21. A machine for assembling into carrying packages a procession of containers issuing from a container filling and closing machine or the like, comprising, in combination, means for supplying a succession of elastic carrier members each defining a plurality of container receiving apertures smaller than said containers and located in two juxtaposed rows, means for arranging the procession of containers in two substantially parallel rows and transporting the containers along a predetermined path through an assembly zone, means for feeding said interconnected series of elastic carriers in a second path spaced from and generally parallel to the container path as it passes through the assembly zone, means for moving said containers and said interconnected series of elastic carriers in timed synchronous relationship with each other, and means for assembling said containers and carrier members to each other including a plurality of first and second pairs of pin elements mounted in generally opposed relationship to each other on support members moving in a closed path at least part of which passes through the assembly zone, means for inserting said first and second pairs of pin elements into aligned, juxtaposed container receiving apertures of said carriers, depressor means adapted to deflect a central portion intermediate the juxtaposed rows of container receiving apertures in position between the container rows and downwardly spaced from the upper ends of said containers, means for causing each of the first and second pairs of pin elements to transcribe an arc on opposite sides of each container whereby said depressor means and pin elements coact to progressively apply the carrier members to containers, and means for separating the succession of carriers from each other to form individual carrying packages.

22. The machine set forth in claim 21 wherein said means causing movement of said pin elements includes means mounting each pair of pin elements for movement in arcuate paths about a corresponding container, and means for moving said pin elements in said arcuate paths to transcribe arcs about said containers.

23. The machine set forth in claim 22 wherein the means mounting each pair of pin elements for movement about a corresponding container includes a linkage mechanism having a plurality of pairs of pivoting arms.

24. The machine set forth in claim 22 wherein the means for mounting each pair of pin elements for movement about a corresponding container includes a first pair of arms pivotally mounted to each other adjacent one end thereof, a second pair of arms each of which are pivotally mounted to one of said first pair of arms adjacent the other end thereof by one of said pin elements, said second pair of arms also being pivotally mounted to each other whereby movement of said first pair of arms causes said pin elements and said second pair of arms to move about the pivot of said second pair of arms.

25. The machine set forth in claim 22 wherein said means mounting each pair of pin elements for movement comprises a spring member mounted in a yieldable fashion to one of said supporting members.

26. The machine set forth in claim 22 wherein said means causing said pin elements to transcribe arcs about containers include a diverging cam track arrangement operatively associated with said pin elements.

27. The machine set forth in claim 22 wherein said means causing said pin elements to transcribe arcs about said containers includes diverging movable supports operatively associated with said pin elements.

28. The machine set forth in claim 21 including means for removing the individual carrying packages therefrom.

29. The method of assembling a group of containers with an elastic carrier member having a like number of apertures therein smaller than said containers comprising, arranging said group of containers in side by side relationship with the upper ends thereof in substantially abutting relationship, supporting said elastic carrier members adjacent the upper ends of said containers, holding a marginal portion of each container receiving apertures adjacent to a corresponding container and below a plane passing through the upper end thereof, and progressively stretching each container receiving aperture beginning adjacent the held marginal portion thereof whereby to effectuate telescopic assembly of said containers and carrier member.

30. The method of assembling a plurality of containers with carrier members initially integrally connected to each other across weakened areas and having a group of apertures therein corresponding in number to, but smaller than the containers to be assembled comprising the steps of, transporting a continuous procession of containers in a first path, moving the connected series of apertured carriers in a second path parallel to and spaced from the upper ends of said containers, holding marginal portions surrounding each container receiving aperture beneath the upper end of a corresponding container with which it is to be associated, and progressively stretching the marginal portions surrounding each container aperture beginning adjacent the held marginal portion thereof to move the carriers and containers in assembled relationship with each other.

31. The method as set forth in claim 30 including the step of separating the carriers assembled to said containers from the interconnected series to form individual carrying packs.

32. The method of assembling a group of containers with a carrier member having a like number of constrictive pockets therein smaller than said containers comprising, arranging said group of containers in side by side relationship with the upper ends thereof in substantially abutting relationship, supporting said carrier member adjacent the upper ends of said containers, holding a marginal portion surrounding each constrictive pocket adjacent to a corresponding container and below a plane passing through the upper end thereof, and progressively stretching each constrictive pocket beginning adjacent the held marginal portion thereof whereby to effectuate telescopic assembly of said containers and carrier member.

33. The method set forth in claim 32 wherein the progressive stretching is accomplished by a force orbiting through at least a portion around the circumference of said containers.

References Cited

UNITED STATES PATENTS

| | | | |
|---|---|---|---|
| 2,864,212 | 12/1958 | Bruce | 53—48 XR |
| 2,874,835 | 2/1959 | Poupitch. | |
| 2,929,181 | 3/1960 | Poupitch | 53—48 XR |
| 3,032,943 | 5/1962 | Reimers et al. | 53—48 |
| 3,032,944 | 5/1962 | Hull et al. | 53—48 |
| 3,044,230 | 7/1962 | Fisher | 53—48 XR |
| 3,234,706 | 2/1966 | Arneson | 53—48 |

WILLIAM W. DYER, Jr., *Primary Examiner.*

GRANVILLE Y. CUSTER, Jr., *Examiner.*

ROBERT L. FARRIS, *Assistant Examiner.*